Patented Jan. 10, 1939

2,143,310

UNITED STATES PATENT OFFICE 2,143,310

PROCESS FOR THE CONTINUOUS EXTRACTION OF ALUMINUM OXIDE FROM BAUXITE

Wilhelm Fulda, Lautawerk, Lausitz, and Rudolf Wittig, Grevenbroich, Niederrhein, Germany No Drawing. Application February 3, 1936, Serial No. 62,224. In Germany February 2, 1935

9 Claims. (Cl. 23—143)

(Granted under the provisions of sec. 14, act of March 2, 1927; 357 O. G. 5)

The hitherto employed Bayer process for manufacturing pure aluminum oxide from aluminum-containing materials, depends upon the extraction of the aluminum oxide from bauxite by means of soda liquor. The existing practice is to submit the bauxite in batches, after roasting in a finely divided state, to extraction by stirring it in an autoclave with soda liquor of above 40° Bé. The mixture must then, before filtering off the iron residues in a filter press, be cooled and diluted to about 25° Bé. The filtration of these iron residues requires a great expenditure of filter material, as peptization of the iron particles occurs owing to the stirring in the autoclave. The aluminum hydrate is then separated by stirring the clear aluminate liquor which constitutes the filtrate. For a fresh extraction the stirred aluminate liquor must then be concentrated by evaporation up to above 40° Bé.

This and the extraction of the material in separate batches, instead of continuously, necessitates a large consumption of heat. Further the filtration involves heavy costs owing to the use of large quantities of textile materials.

These disadvantages of the Bayer process are removed by the present invention.

It has been found that bauxite can be subjected easily to complete extraction in the stationary condition by causing hot soda liquor and especially a stirred aluminate liquor (i. e. aluminate liquor from which aluminum hydrate has been removed by stirring as described above) to flow through it at a high temperature and under pressure. The bauxite is introduced in a coarse state of subdivision into towers, the bottoms of which are advantageously constructed as sieve plates, i. e. by making them of porous carbon. The stirred aluminate liquor of about 22° Bé., if desired with addition of the washing water of the separated aluminum hydrate or after slight evaporation to a concentration of about 28° Bé., is pumped into a preheater, there heated to about 180° C. and then passed through a tower filled with bauxite or through one or more such towers in series. The size of the towers and the quantity of bauxite are preferably so selected that the liquor flowing from the last tower is of the molecular constitution $$Al_2O_3:Na_2O = 1:1.8$$

The temperature of the liquor in the towers is maintained at at least 160–180° C. by means of heating jackets. The liquor leaving the towers is sent through a heat exchanger, which raises the entering stirred aluminate liquor to the extraction temperature. The aluminum hydrate is removed by stirring from the liquor leaving the towers in the ordinary way.

The removal of extraction residues from the towers may for example be effected by running water through them.

A process is known in which bauxite is submitted to continuous extraction by stirred aluminate liquor of 20–22° Bé. at temperatures above 190° C. and at high pressures (up to 100 atmospheres). The new process has the following important advantages over this known process:—

1. It is not necessary to grind the bauxite to a very fine state of subdivision.
2. The filtration of the stationary bauxite involves no difficulties and little if any filtration costs.
3. No particularly high pressures or temperatures are necessary, which involve heavy radiation losses and are very difficult to work with in practice.

The following is an example of how the process according to the invention may be carried into practice.

A pressure resisting iron tower with a sieve bottom of porous carbon plates was filled with 1000 kg. of calcined bauxite, of a grain size of about 5 mm. The tower was well insulated. From a supply tank, containing stirred aluminate liquors concentrated to about 20° Bé. and at a temperature of 179° (corresponding to a pressure of 9 atmospheres), the liquor flowed continuously through the tower filled with bauxite. Behind the tower was a reducing valve which regulated the speed of flow of the liquor. The liquor flowing from the tower had a molecular constitution of $Al_2O_3:Na_2O = 1:1.8$, and was only slightly darkened by iron oxide which was readily removable by a suitable filter. The liquor from the tower was sent in countercurrent through a heat exchanger, through which the stirred aluminate liquor was pumped on its way from the tank to the tower.

The washed extraction residue gave an analysis a yield of 93% aluminum oxide. The switching over from a fully extracted tower to a tower freshly filled with bauxite was easily done by changing over the pipe connections from the tank.

Equal success was obtained when the stirred aluminate liquor had a concentration of 19.2° Bé.

What we claim is:

1. A process for the continuous extraction of aluminum oxide from bauxite which comprises contacting a continuous flow of heated caustic soda liquor under pressure with a stationary charge of coarse bauxite, effecting thereby a practically complete dissolution of the aluminum oxide contained in the bauxite and treating the resulting sodium aluminate solution for the precipitation and recovery of the aluminum oxide.

2. In a process for the continuous extraction of aluminum oxide from bauxite the step of continuously flowing a heated caustic soda liquor under pressure through a stationary column of coarse bauxite.

3. A process for the continuous extraction of aluminum oxide from bauxite which comprises contacting a continuous flow of heated caustic soda liquor under pressure with a stationary charge of coarse bauxite, effecting thereby a practically complete dissolution of the aluminum oxide contained in the bauxite, treating the resulting sodium aluminate solution for the precipitation and recovery of the aluminum oxide, and recirculating the aluminum oxide freed solution for further decomposition of the bauxite.

4. A process for the continuous extraction of aluminum oxide from bauxite which comprises contacting a continuous flow of heated caustic soda liquor under pressure with a stationary charge of comparatively coarse bauxite to effect an aluminate solution practically equal to the molecular constitution $Al_2O_3:Na_2O = 1:1.8$, precipitating from this solution the aluminum oxide, separating the same and recirculating the aluminum oxide freed solution for further extraction of the bauxite.

5. In a process according to claim 1, the step of bringing the aluminum oxide freed solution to a concentration of about 20–28 Bé. and recirculating the same for renewed extraction.

6. A process according to claim 1, characterized by maintaining a temperature of about 160–180° C. during the decomposition of the bauxite.

7. A process according to claim 3, characterized by maintaining a temperature of about 160–180° C. during the decomposition of the bauxite.

8. A process according to claim 1, consisting in heating the caustic soda liquor by flowing the same in countercurrent to the hot solution produced by the dissolution of the bauxite.

9. A process according to claim 3, consisting in heating the recirculated aluminum oxide freed solution by flowing the same in countercurrent to the hot solution produced by the decomposition of the bauxite.

WILHELM FULDA.
RUDOLF WITTIG.